Figure 1:
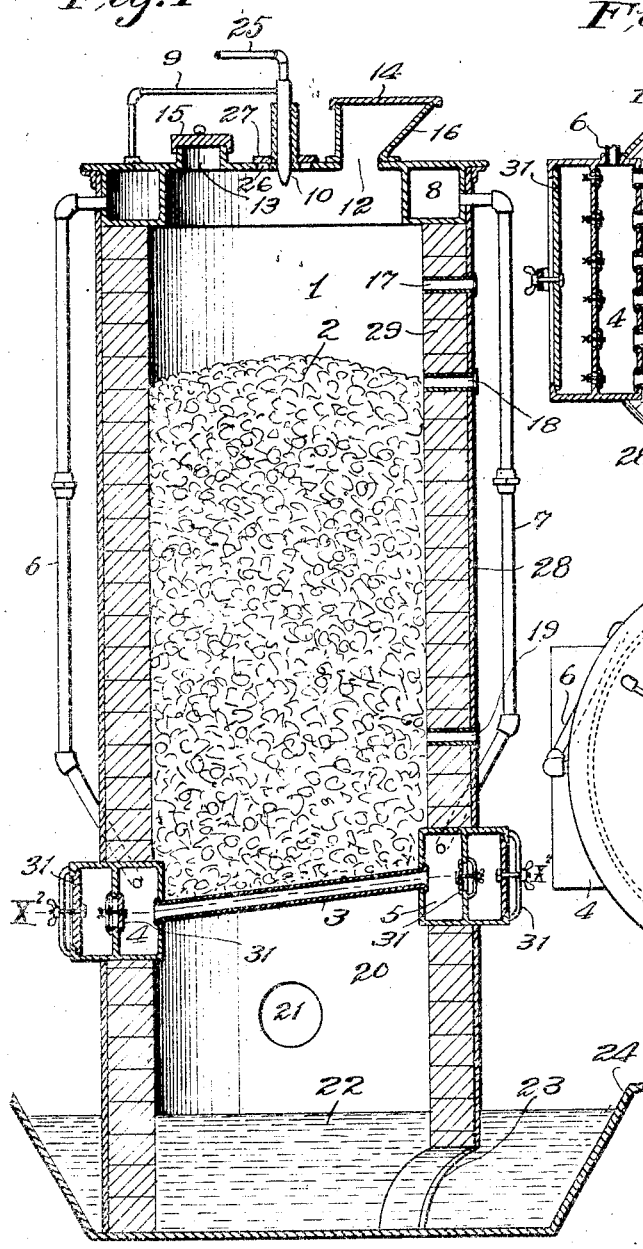

H. A. GRINE.
METHOD OF MAKING FIXED GAS FROM LIQUID HYDROCARBON FUELS.
APPLICATION FILED MAR. 24, 1909.

952,989. Patented Mar. 22, 1910.

Witnesses
C. C. Holly
Fred a Krellas.

Inventor
Harry A. Grine
James R. Townsend
his Atty.

UNITED STATES PATENT OFFICE.

HARRY A. GRINE, OF LOS ANGELES, CALIFORNIA, ASSIGNOR OF ONE-HALF TO FRED C. NELLES, OF LOS ANGELES, CALIFORNIA.

METHOD OF MAKING FIXED GAS FROM LIQUID-HYDROCARBON FUELS.

952,989.  Specification of Letters Patent.  Patented Mar. 22, 1910.

Application filed March 24, 1909. Serial No. 485,539.

*To all whom it may concern:*

Be it known that I, HARRY A. GRINE, a citizen of the United States, residing at Los Angeles, in the county of Los Angeles and State of California, have invented a new and useful Method of Making Fixed Gas from Crude Oil or other Liquid - Hydrocarbon Fuels, of which the following is a specification.

This invention relates to the production of various kinds of gas, and may be employed in the production of what is ordinarily termed producer-gas for heat and power purposes, and also in the production of domestic-gas for heating and illuminating purposes.

The invention may be employed with different forms of apparatus.

For purposes of explanation I shall refer to a drawing corresponding in many particular to the drawing filed in my companion application for patent on apparatus for generating gas from liquid hydrocarbon and solid carbonaceous material, which was filed in the United States Patent Office, January 2, 1909, Serial No. 470,524, and which shows means for holding a carbonaceous bed in position to receive crude oil with steam and air or other oxygen-carrying medium from above, and to allow the gaseous products therefrom to pass out below through an apparatus for generating steam that may be used for atomizing the crude oil.

In carrying out this newly-invented method of producing gas a permeable fuel-bed of solid carbonaceous material consisting of the unconsumed liquid-hydrocarbon is maintained in a state of incandescence, oxygen and liquid-hydrocarbon are supplied at one end of the incandescent carbonaceous fuel-bed, and different pressures are maintained at the opposite ends of the fuel-bed; the higher pressure being at that end at which the liquid hydrocarbons are applied, so that a flow of the liquid hydrocarbon, the oxygen, and the products produced therefrom by the reactions which occur within the incandescent fuel-bed, will take place onward through the fuel-bed and out of the fuel-bed at the other end in the form of a fixed gas. Oxygen is usually supplied by admitting with the hydrocarbon, atmospheric air, aqueous vapor, steam, or other oxygen-carrying medium.

In carrying on this process the heat of the incandescent mass and the hot gases that flow therefrom may be applied to produce, and where desired, to superheat the steam that is introduced with the oxygen and hydrocarbon, or used to spray the hydrocarbon; thus obviating the necessity of supplying air-compressors, high-pressure pumps, or other means of producing pressure for the spraying of the oil. The difference in pressures between the inlet and outlet ends of the incandescent fuel-bed may be produced by suction from any source, as the suction of an engine using the gas, by a gas-exhauster, or in any other way; atmospheric air or other oxygen-carrying medium being admitted at the other end of the fuel-bed, with the sprayed hydrocarbon.

Preferably, the hydrocarbon is introduced at the top of the retort or furnace where it is vaporized, atomized or sprayed into the upper part of the retort or furnace by means of a sprayer, atomizer, vaporizer, or burner. The oil is partly consumed in the flame from the sprayer, etc.; then deposits upon the carbon fuel-bed and carbonizes there. The pressure for vaporizing, atomizing, or spraying may be supplied by any suitable means, such as gravity, compressed air, steam, or high-pressure pump.

In the use of crude oil for making gas by this process, the carbonization of the hydrocarbon upon the inlet side of the incandescent fuel-bed is due to the fact that when crude oil is sprayed into a hot chamber and impinges upon any surface the oil particles leaving the sprayer, burner or atomizer undergo a distillation; the lighter hydrocarbons distilling out and igniting, and the heavier hydrocarbons with higher ignition temperature passing on and depositing upon the impinged surface.

The length of the incandescent carbonaceous fuel-bed through which the hydrocarbon, the oxygen-carrying medium, and the products therefrom must pass may vary within considerable limits so that it is only necessary to maintain a sufficient length of bed without making such length excessive. After the appropriate length of bed has been once determined by testing the gas produced, the attendant may, by the eye, determine when the length becomes insufficient or excessive.

In practice, a chamber of suitable depth is provided to contain the fuel-bed, and the top of the fuel-bed is then maintained at a suitable level within said chamber which may be open through peep-holes or otherwise, to the observation of the attendant; the principle being that the products from the materials admitted at the inlet end of the fuel-bed shall pass through such length of an incandescent carbonaceous material as will be necessary to break up the hydrocarbons, fix the products of this breaking-up as a permanent gas, and to entrap lamp-black formed by breaking up the hydrocarbons and to hold the same until it is consumed in the formation of carbon-monoxid and carbon-dioxid.

The incandescent carbonaceous fuel-bed serves a double purpose. In one instance it serves as a carbon-reservoir from which the oxygen may take up carbon in case the supply of hydrocarbon at the inlet-end of the fuel-bed is deficient; and second, it serves as a reservoir to retain carbon when an excess of hydrocarbon is applied to the inlet-end of the fuel-bed.

When making domestic or illuminating gas, using steam and hydrocarbon fuel for that purpose, there is a tendency for accumulations of carbon to form upon the inlet side of the fuel-bed, thus building up the fuel-bed. There is also a tendency to lower the fuel-bed temperature.

The carbon accumulation is consumed during a period in which little steam and considerable air are used, forming a producer-gas for heating and power purposes, as for use in internal-combustion engines, and the like; and at the same time heating up the fuel-bed, thus giving an economical alternating process. When it is not desired to use the alternating process, an excess of air may be supplied during the heating-up period; the gases then generated not necessarily being conserved as producer-gas. Preferably, a quantity of steam is applied, the quantity being increased when domestic gas is to be produced, and being appropriately reduced and mixed with air when it is desired to simply make producer-gas.

It is not necessary that the operation be alternated from producer-gas to illuminating gas, for the reason that by properly proportioning the mixture of hydrocarbon and oxygen-carrying medium admitted on the inlet-side, the carbonization of the hydrocarbon on the fuel-bed can be made sufficient to maintain the bed of solid carbon; that is to say, the carbon formed by the carbonization of the hydrocarbon upon the solid fuel-bed may be made to counterbalance that which is consumed in the formation of carbon-monoxid and carbon-dioxid in the gas. With the process thus performed, a suitable heat is maintained in the incandescent fuel-bed sufficient to cause the required reactions and to produce a fixed gas suitable for heat and power.

It is preferable in producing an illuminating gas that no atmospheric air be admitted, and that said gas be produced directly from steam and hydrocarbon alone. In such case, accumulations of solid carbon occur. From time to time a return can be made to the production of producer-gas, which is accomplished by reducing the amount of steam and the admitting of oxygen or an oxygen-carrying medium; whereupon the carbon is gradually consumed, thus making producer-gas during a period which may be termed the burning-out period; the same corresponding to the burning-out period in former methods of producing illuminating gas from liquid hydrocarbons. The saving introduced by making producer-gas during this "burning-out" period adds materially to the economy of the process.

It is quite practicable to generate a fixed gas without the use of steam, by substituting compressed air or various other oxygen-carrying media, though the best results are derived when some steam is used.

Figure 2:
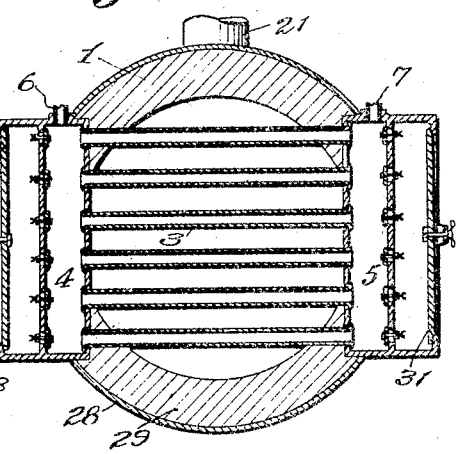
Figure 3:
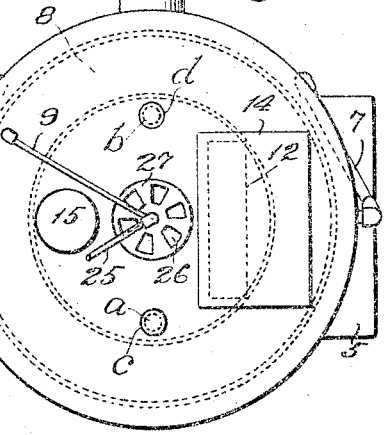

Referring to the accompanying drawings:—Figure 1 is a vertical, sectional elevation of an apparatus adapted to be employed in conducting my newly-invented process in its various applications for producing various kinds of gas. Fig. 2 is a plan section on line $x^2$, Fig. 1. Fig. 3 is a plan of the top.

1 represents a chamber, and 2 an incandescent fuel-bed therein which may at the outset be composed of coke, charcoal, anthracite, or other solid carbonaceous matter capable of being maintained in a state of incandescence by its own combustion with oxygen. Said body is supported by a grate 3 which may be formed of water-tubes or otherwise, said tubes extending across the bottom of the chamber and communicating at their opposite ends with hollow heads 4 and 5 which are connected by steam-pipes 6, 7, with an annular steam-drum 8 at the top of the chamber 1, from which drum steam may be supplied through a pipe 9 to an atomizer 10 that may be of any ordinary form of oil-burner discharging into the chamber 1 and onto the top of the incandescent bed 2.

In the top 11 of the chamber 1 orifices 12, 13, $a$ and $b$, may be provided, the same being closed by covers 14, 15, $c$ and $d$, the inlet 12 being provided with a hopper 16 through which carbonaceous material may be introduced into the chamber when desired to maintain the required height therein of the incandescent bed. The orifice 13 may be used for inspection of the interior of the chamber and for admitting a purge pipe, not shown, through which gas generated during the preliminary heating up of the generator, may escape; and also to introduce a poker with which to stir the bed as occasion requires. Peep-holes 17, 18, 19 may be provided at different levels through the wall of the chamber 1 for the inspection of the interior by the attendant, the intermediate hole 18 being at the approximate level of the incandescent bed, and peep-hole 19 being arranged approximately at the top of the ash-bed which may form under the incandescent bed. Underneath the grate-bars 3 is a gas-chamber 20 having a gas-outlet 21 above a water-seal 22 that seals a clean-out hole 23 which opens into an ash-pan 24, and through which ashes may be removed without allowing the gas to escape.

Oil is admitted to the atomizer or burner through pipe 25, and air is admitted through an inlet 26 around the vaporizer-nozzle, said inlet 26 being controlled by any form of damper, as a register 27. The chamber 1 may be constructed of an external sheet-iron shell 28 and an internal fire-brick lining 29.

The heads 4 and 5 are provided with caps 31, which are similar to those in use in steam-boilers. These are used to close openings opposite to the ends of the water-tubes 3. The caps are removable, thus giving access to the water-tubes 3 for such purposes as inspection, cleaning, or repairs.

In practical operation, the bed of carbonaceous material may be three feet more or less in depth, and oil together with an oxygen-carrying medium may be introduced through the nozzle and the orifice 26. Where steam is used to spray or atomize the oil the pressure of steam may vary according to the judgment of the operator; fifty pounds more or less per square inch steam-pressure being effective for the purpose. The amount of air may be regulated by turning the damper.

In the production of illuminating gas, accumulations of carbon occur, causing the carbonaceous fuel-bed to rise above the normal level. By reducing the amount of steam and admitting more oxygen through the air-opening, or either, the gas thus produced will be in the nature of producer-gas which may be directed to a different holder from that in which the illuminating gas is stored. In this way the level of the carbonaceous material may be reduced to the normal, and thereupon the production of illuminating gas may be again proceeded with. The incandescent carbonaceous bed may thus be maintained in whole or in part from the hydrocarbon that is introduced through the burner; but if desirable, any additional carbonaceous material formed by the decomposition of the hydrocarbon fuel, such as tar, lamp-black, or both, which may escape through the incandescent fuel-bed and be extracted from the gas in scrubbers or other apparatus for cleansing the gas, may be returned to the chamber for the purpose of assisting in maintaining the carbonaceous bed. By causing the partial combustion to occur over the top of the permeable incandescent carbonaceous bed, the ungasified products deposit on and pass down into the upper side of such incandescent bed, and in turn become incandescent, thus automatically and by the operation of gravity maintaining said bed while the refuse materials, if any, and any by-products that may be formed, may pass out of the bed at the bottom thereof. For this reason the form of apparatus shown in the drawings is preferred for carrying on the process.

I claim:—

1. The method set forth of producing gas which consists in maintaining partial combustion of liquid-hydrocarbon over the top of a permeable bed of incandescent solid carbonaceous fuel, causing solid carbonaceous products from such partial combustion to deposit upon and in the top of said bed and gaseous products from such partial combustion to pass downward through said incandescent carbonaceous bed to the outlet side of said bed, thereby producing a fixed gas from the fuel and the first-mentioned gaseous products and delivering the same from said incandescent carbonaceous bed at the outlet side thereof while additions of solid carbonaceous material are being made as aforesaid at the upper portion of said incandescent carbonaceous bed.

2. The method set forth of producing gas, which consists in maintaining partial combustion of liquid-hydrocarbon on one side of a permeable bed of solid carbonaceous fuel, causing solid carbonaceous products from such partial combustion to deposit on the inlet side of the bed and gaseous products of such partial combustion to pass through the carbonaceous bed, thereby producing fixed producer-gas from the fuel and such gaseous products at the outlet side of said bed, sufficient oxygen being meanwhile supplied to maintain the bed in an incandescent state and said bed being maintained by accumulations of such solid products; then reducing the supply of oxygen and supplying steam with the liquid-hydrocarbon to the inlet side of the bed, thereby adding an excess of solid carbonaceous material to the bed and producing illuminating gas from the fuel and gaseous products at the outlet side of the bed; then reducing the supply of steam and increasing the supply of oxygen and again causing the partial combustion as before, thereby again making producer-gas.

3. The method set forth of making gas, which consists in passing the gaseous products from partial combustion of liquid-hydrocarbon through an incandescent carbonaceous bed and maintaining such bed by accumulations of unconsumed carbonaceous fuel resulting from decomposition of the liquid-hydrocarbon.

4. The method of making gas, which consists in passing products from partial combustion of liquid hydrocarbon through an incandescent carbonaceous bed and maintaining such bed by accumulations of unconsumed carbonaceous material added to the bed on the side where such partial combustion occurs.

5. The method set forth of making gas, which consists in passing gaseous products from partial combustion of liquid-hydrocarbon downward through an incandescent carbonaceous bed that is maintained by unconsumed carbonaceous material added to the top of the bed, said partial combustion of the liquid hydrocarbon being effected on the top side of said incandescent bed.

6. The method set forth of producing gas from liquid hydrocarbons, which consists in subjecting liquid hydrocarbons to partial combustion and decomposition with an oxygen carrying medium, forming gaseous and solid carbonaceous products, such as carbonized oil, or oil coke, lamp-black and tar; utilizing said solid carbonaceous products in forming and maintaining an incandescent bed of solid carbonaceous material; passing the aforesaid gaseous products onward through this bed, thereby fixing them, and withdrawing said gaseous products, together with those formed in the solid carbonaceous bed, at the outlet side of said bed.

In testimony whereof, I have hereunto set my hand at Los Angeles, California, this 17th day of March, 1909.

HARRY A. GRINE.

In presence of—
JAMES R. TOWNSEND,
H. WELLES.